(12) United States Patent
Gantenhammer et al.

(10) Patent No.: US 7,089,506 B2
(45) Date of Patent: Aug. 8, 2006

(54) METHOD FOR SELECTING PRODUCTS

(75) Inventors: Andreas Gantenhammer, Düsseldorf (DE); Julia Gantenhammer, Willich (DE)

(73) Assignee: Andreas Gantenhammer, Willich (DE)

( * ) Notice: Subject to any disclaimer, the term of this patent is extended or adjusted under 35 U.S.C. 154(b) by 690 days.

(21) Appl. No.: 10/203,358

(22) PCT Filed: Jan. 20, 2001

(86) PCT No.: PCT/EP01/00629

§ 371 (c)(1),
(2), (4) Date: Aug. 27, 2002

(87) PCT Pub. No.: WO01/59611

PCT Pub. Date: Aug. 16, 2001

(65) Prior Publication Data

US 2003/0112272 A1    Jun. 19, 2003

(30) Foreign Application Priority Data

Feb. 10, 2000   (DE) .................................. 100 05 832

(51) Int. Cl.
*G06F 3/048*    (2006.01)
*G06Q 30/00*   (2006.01)

(52) U.S. Cl. ................. 715/850; 715/962; 715/968; 715/852; 715/854; 707/3; 707/4; 705/26; 705/27; 705/28

(58) Field of Classification Search ................. 715/821, 715/521, 962, 500.1, 968, 848, 850, 851, 715/852, 854; 705/26, 27, 28; 345/583, 345/653; 707/4, 3
See application file for complete search history.

(56) References Cited

U.S. PATENT DOCUMENTS

| 4,506,326 | A | * | 3/1985 | Shaw et al. ................. 707/4 |
| 4,712,191 | A | * | 12/1987 | Penna ........................ 715/853 |
| 5,265,246 | A | * | 11/1993 | Li et al. ....................... 707/4 |
| 5,557,794 | A | * | 9/1996 | Matsunaga et al. ............ 707/3 |
| 5,717,865 | A |   | 2/1998 | Stratmann .................... 395/210 |
| 5,734,888 | A | * | 3/1998 | Li et al. ....................... 707/4 |
| 6,104,398 | A | * | 8/2000 | Cox et al. ................... 715/821 |

* cited by examiner

*Primary Examiner*—Raymond J. Bayerl
*Assistant Examiner*—Anita Datta Chaudhuri
(74) *Attorney, Agent, or Firm*—Norris McLaughlin & Marcus PA

(57) ABSTRACT

The invention relates to a method for selecting products, wherein with each product there is associated a data set with a plurality of product characteristics, wherein the selection of a product is performed based on criteria selected by a user relating to the characteristics, and wherein the selection is displayed on a graphic display unit.

The object of the invention to simplify the selection process in such a way that the number of results is limited by simplifying the criteria for the characteristics, is solved by setting the criteria for the characteristics on at least two scales and setting the criteria on the scales with the help of at least one input device in conjunction with the graphic display unit.

9 Claims, 2 Drawing Sheets

METHOD FOR SELECTING PRODUCTS

BACKGROUND OF THE INVENTION

The invention relates to a method for selecting products, wherein with each product there is associated a data set with a plurality of characteristics of the product, wherein the selection of a product is performed based on user-defined criteria relating to the characteristics, and wherein the selection is displayed on a graphic display unit.

Methods known so far for selecting products allow the user to perform a targeted search for individual products in a product group with the help of search functions. The products are classified based on their characteristics and data sets are generated for the individual products. The database generated in this manner can be searched by using various search algorithms according to the criteria inputted by the user. It happens frequently during searches in large databases that an exceedingly large number of products matches the search criteria inputted by the user which makes it very difficult for the user to make a selection.

One example for the aforedescribed selection method is the Internet sales offer from the company Amazon.com. This online merchant offers a variety of products via its Internet pages. The products are initially subdivided into product groups, such as for example books, music and various other products. The user has to first select the desired product group, whereafter he can search within this product group for all available products that are offered by the merchant Amazon.com. In addition to this first coarse product classification, the products are subdivided into individual categories. For example, the available book titles are here subdivided into categories, such as biographies, computer, money, community, children's books, youth books, art and culture, etc. When the user selects one of these product categories, he is offered by the merchant a selection of several products associated with this category. The user can again select certain sub-categories within a category. For example, under the category biographies, the sub-categories Federal Republic of Germany, DDR, important personalities, diaries or current events can be found. The user has the option to perform a hierarchical search in these sub-categories or to search the respective selected category, respective sub-category using key words.

If the user wishes to order a certain product from the goods offered by the merchant, then he has to describe this product with the search function so narrowly that the result of the search steers him to the desired product, or he has to search through the hierarchically arranged search trees of the product categories. Only at the end of his search will he get an idea if a search actually leads him to the desired product.

Another known sales offer is the sales offer in the Internet from the company Quelle. The selection method also enables the user to search within the available products by using a selective search query. Because of the company Quelle offers a large number of products, a search of all available products produces a confusingly large number of results. To support the user in his search and selection of the desired products, the offered products are already subdivided into specific categories, such as small appliances, home improvement, sports, fashion and consumer electronics. After the user has selected one of these categories, he can perform a more refined search within the sub-categories. For example, under the category consumer electronics, there are sub-categories photography, TV sets, DVD, etc. If the user looks for products for a DVD player, then he will certainly select the category DVD. In the category DVD, the products are again subdivided into the product categories DVD-software, sets, players. In the category software, the user now finds all available DVD movies and can select the desired product from the large number of offered products.

Disadvantageously, a search with search queries performed according to the aforedescribed state of the technology produces, one hand, an unmanageable large number of results. For the search to be successful, the user has to accurately describe the product he is looking for. On the other hand, the searches through the hierarchically constructed search trees are very time-consuming for the user, and the user only finds out at the end of the search if the correct product is among the selection.

SUMMARY OF THE INVENTION

Starting from the aforedescribed state of the technology, it is a therefore an object to simplify the selection process in such a way that the number of results is limited by simplifying the criteria applied to the product characteristics.

The invention solves the aforedescribed object in that the criteria for the product characteristics are set on at least two scales and the criteria on the scales are set with the help of at least one input device in conjunction with the graphic display unit.

Because the user can search through the offered products with the help of at least two scales, wherein the scales represent characteristics of the products, a selection is possible based on criteria relating to the product characteristics. Since the criteria on the scales can be changed in parallel, the product offers can be easily navigated. Representative results are displayed to the user already during the search within the product categories defined by the scales. For example, the entire range of nature films offered within a product category for nature films can be searched based on two scales, with one scale representing the mood expressed in the film and the second scale representing the timeliness of the representative film. The display gives already during the search an overview over the corresponding products that match the predetermined characteristics. This type of selection method enables the user to search within a product offer in a time-saving manner, whereby the user does not have to precisely specify the product in order to make his selection.

The criteria set on scales can be selected based on both discrete and continuous changes. When the criteria on the scales change in a discrete manner, the products need to be classified in such a way that their characteristics can be associated with well-defined categories. When the criteria on the scales change in a continuous manner, the products need to be classified in such a way that they can be recalled with the help of continuous scales. For example, a movie could be classified on a "mood" scale between "gloomy" and "merry". A movie can, on the other hand, be associated with exactly one of these two categories, on the other hand, the movie can also be placed fuzzily between these two categories.

To better present the product and to visualize on the scales the changes made by the user, it is helpful to subdivide the graphic display unit into at least four sections in such a way that in a first section the characteristics associated with the current criteria are displayed, that in a second section of the display unit a selection of the products corresponding to a combination of the characteristics is displayed, that in a third section the scales are displayed, and that in a fourth section product information of the selected products is displayed. This enables the user, on one hand, to recognize the current criteria on the scales and, on the other hand, to select from an assortment of products that correspond to these criteria. The user will therefore know very quickly in which direction the criteria have to be changed to find a product with the desired characteristics.

A guarantee can be given that the actually selected product is ordered or that additional information regarding this product is obtained by showing an interface in a section of the graphic display unit and by sending after an interaction between the user and the interface information about the product that was selected at that time to a remote computer and by processing this information with the help of information associated with the user. A user can thereby conveniently order the selected product. Additional product information can also be sent to the user in this manner. For example, with music products, the user can listen to brief excerpts from the selected music piece.

The selection of the products is simplified to a large degree by displaying and/or playing graphic and/or acoustic content that corresponds to the respective criteria while the criteria on the scales on the graphic display unit change. For example, when selecting movie products, movie clips from the movies can be played on the graphic display unit while the criteria on the scales change. Images and sound can also be played which are associated by the user with the corresponding criteria.

By subdividing the data sets in a first step into data groups characterized by generic terms and by adapting in a second step the scales according to the selected data groups, the scales can be dynamically changed depending on the selected data groups. For example with movie products, it may be possible to offer a user for those movies that belong to the data group Nature Films a "mood" scale between "eventful" and "informative", as well as a "time" scale between "current" and "ancient". In the data group science-fiction, the "mood" scale can be moved between the values "gloomy" and "merry" and the "time" scaled between "Middle Ages" and "distant future".

The product selection is made more convenient by highlighting in the first step on the graphic display unit on a body having a plurality of planes a plane representing the actual data group depending on the selected top category, by setting in the second step criteria for the product characteristics, and by then highlighting on the graphic display unit a location within the selected plane which represents the combination of the at least two criteria. The criteria inputted by the user are processed graphically so that the user is always informed about the actual status of these criteria. Hence, he does not get lost during the search, but can find the products in a targeted fashion, which have the characteristics matching the selected criteria.

DETAILED DESCRIPTION OF THE PREFERRED EMBODIMENTS

Figure 1:
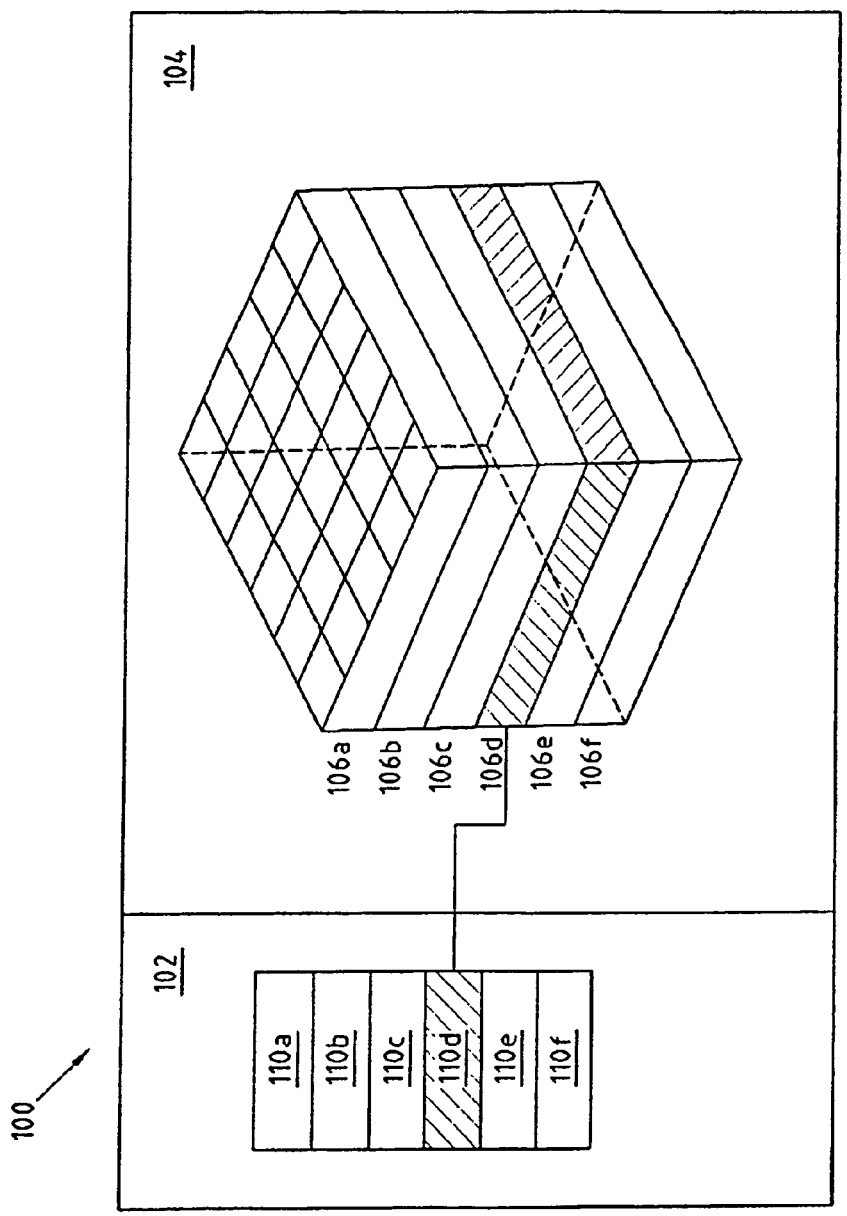
FIG. 1 a first step of the selection method of the invention.

FIG. 1 depicts a graphic display unit 100. The graphic display unit 100 which is implemented, for example, as a LCD display or a monitor, is subdivided into two sections 102 and 104. The various product categories 110a–f for a particular product group, for example books, music CDs or video movies, are displayed in section 102. For example, the product categories comedy, home, suspense, science-fiction, Western and cartoon are displayed in the product group video movies. The user can select from the product categories 110a–f with the help of the input device (not shown), for example a mouse. A cube 106 is shown in section 104. The cube is subdivided into different layers 106a–f, which represent the product categories 110a–f that can be selected by the user. When the user selects one of the product categories 110a–f, the corresponding plane of the cube 106 is optically highlighted. As seen in FIG. 1, the user has selected the product category 110d science-fiction. As a result of the selection, the plane 106d of secure 106 is optically highlighted. After the user has made a final selection of a product category, the plane of the cube 106 that represents the product category selected by the user is highlighted on the graphic display unit.

Figure 2:
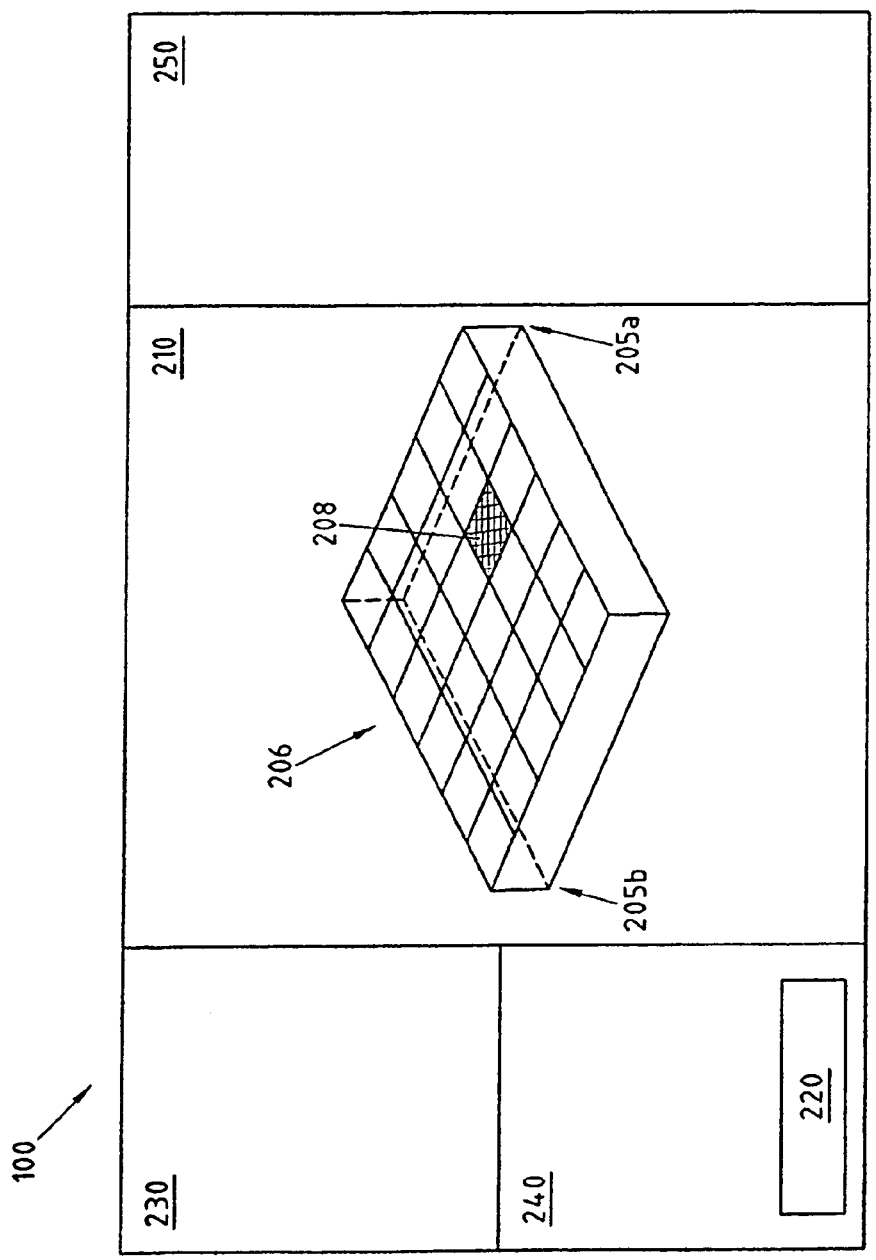
FIG. 2 a second step of the selection method of the invention.

FIG. 2 shows such a plane 206. The graphic display unit 100 is here subdivided into four sections. The plane 206 which represents the product category 110d selected by the user is illustrated in section 210. Section 230 always gives the user an overview over the selected criteria. In this section, the exemplary product category "Science-Fiction", the product attribute "Future", the mood "Gloomy" and the era "The 80-ties" are shown for the movies to be displayed according to the criteria. In section 240, a selection of available products with the characteristics corresponding to the selected criteria are displayed to the user. The user can select the desired product with the input device (not shown). After the user has selected the desired product, more information relating to this product can be displayed to the user in section 250. For example, an image or a film clip of a selected movie can be shown in this field. In addition, title, release date, actor and sales price can be displayed.

As mentioned above, the plane 206 is depicted in section 210. The plane 206 represents the two scales 205a and 205b on which the user can select the criteria for the products within the selected product category. While the user navigates within this plane 206 with the help of the input device (not shown), the corresponding location 208 is optically highlighted. The user can now freely move on these scales and define criteria for his selection. The farther he moves along the scale 205a, the farther the advances in the "era" scale. The user can now select along the scale 205a among science-fiction movies from the Middle Ages and from the distant future. Along the scale 205b, the user can select a criterion relating to the mood conveyed by the movie to be selected. The scale 205b offers the user the possibility to select between a merry and a very gloomy mood. A selection of available products is displayed in the section 240 reflecting the combination of the criteria on the scales of the plane 206. It would also be feasible for the user to move in section 210 not only within a two-dimensional plane 206, but to select with the help of suitable input devices search criteria on scales arranged along other directions in a multi-dimensional space.

The user can order the product with the help of section 220. For this purpose, the user activates the plane 220 with the help of the input device (not shown), whereafter the product data for the selected product are transmitted to a remote computer (not shown). The computer processes the user's order, and the user then receives the ordered product.

The invention claimed is:
1. Method for selecting products
   wherein a data set with a plurality of product characteristics is associated with each product,
   a product is selected based on search criteria selected by a user regarding the characteristics, information about the selected product is displayed on a graphic display unit,
the search criteria for the characteristics are selected from at least two scales
by way of at least one input device in conjunction with the graphic display unit, the method comprising the steps:
subdividing the data sets into data groups characterized by generic terms,
representing said data groups as a plurality of corresponding planes of a three-dimensional body displayed on the graphic display unit,
selecting a data group by selecting the corresponding plane on the graphic display unit, whereby the selected plane is highlighted on the graphic display unit,
providing a particular set of at least two scales which corresponds to each data group,
selecting a combination of at least two search criteria, and
highlighting on the graphic display unit a location within the selected plane which represents the combination of the at least two search criteria.

2. Method according to claim 1, further comprising the step of selecting
the search criteria based on discrete changes on the scales.

3. Method according to claim 1, further comprising the step of selecting
the search criteria based on continuous changes on the scales.

4. Method according to claim 1,
wherein the graphic display unit is subdivided into at least four sections in such a way that in a first section product characteristics associated with the selected search criteria are displayed, that in a second section a selection of products corresponding to a combination of the product characteristics is displayed, that in a third section the scales corresponding to said selected data group are displayed, and that in a fourth section product information relating to a selected products is displayed.

5. Method according to claim 1, further comprising the steps of:
displaying
an interface in a section of the graphic display unit, after an interaction between a user and the interface, sending product information about a selected product to a remote computer, and processing the product information in conjunction with user information associated with the user.

6. Method according to claim 1,
wherein when a user changes the search criteria, graphic content corresponding to the changed search criteria is displayed on the graphic display unit.

7. Method according to claim 1,
wherein when the user changes the search criteria, acoustic content corresponding to the changed search criteria is played by loudspeakers substantially arranged on the graphic display unit.

8. Method according to claim 1,
wherein the body representing the planes of the data groups is formed by a cube.

9. Method according to claim 1,
wherein the body representing the planes of the data groups is formed by a sphere.

* * * * *